(12) United States Patent
Zhang et al.

(10) Patent No.: US 9,055,537 B2
(45) Date of Patent: Jun. 9, 2015

(54) METHODS AND APPARATUS FOR SIRE-BASED DLTPC REJECTION

(71) Applicant: QUALCOMM Incorporated, San Diego, CA (US)

(72) Inventors: Wei Zhang, San Diego, CA (US); Ning He, San Diego, CA (US); Sharif Ahsanul Matin, San Diego, CA (US); Mohammad J Al-Saleh, San Diego, CA (US); Nitin Kasturi, Saratoga, CA (US); Prashant Udupa Sripathi, San Jose, CA (US); Messay Amerga, San Diego, CA (US); Krishna Chaitanya Mukkera, San Diego, CA (US); Iyab I Sakhnini, San Diego, CA (US); Ravi Gopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 13/763,216

(22) Filed: Feb. 8, 2013

(65) Prior Publication Data

US 2013/0324179 A1    Dec. 5, 2013

Related U.S. Application Data

(60) Provisional application No. 61/655,897, filed on Jun. 5, 2012.

(51) Int. Cl.
*H04B 7/00* (2006.01)
*H04W 52/00* (2009.01)
*H04W 52/24* (2009.01)

(Continued)

(52) U.S. Cl.
CPC ............ *H04W 52/241* (2013.01); *H04W 52/56* (2013.01); *H04W 52/08* (2013.01)

(58) Field of Classification Search
CPC ........................... H04W 52/241; H04W 52/04
USPC .................. 455/522, 452.2, 501, 63.1, 67.11, 455/67.13, 69, 500
See application file for complete search history.

(56) References Cited

U.S. PATENT DOCUMENTS 6,269,239 B1    7/2001  Hashem et al.
2004/0166884 A1  8/2004  Oh et al.

(Continued)

FOREIGN PATENT DOCUMENTS

WO    WO-2005002083 A1   1/2005
WO    WO-2008/100954 A2   8/2008
WO    WO-2012/135751 A1  10/2012

OTHER PUBLICATIONS

International Search Report and Written Opinion—PCT/US2013/044161—ISA/EPO—Aug. 28, 2013.

*Primary Examiner* — John J Lee
(74) *Attorney, Agent, or Firm* — Charles Chesney

(57) ABSTRACT

Disclosed are methods and apparatus for rejecting unreliable downlink (DL) transmit power control (TPC) commands based on signal-to-interference-ratio estimates (SIRE). The method includes receiving by a user equipment (UE) a DL transmit power control (TPC) command from a base station; calculating a signal-to-interference ratio estimate (SIRE) for the DL channel; determining a scaling factor for a DLTPC rejection threshold based on the DL channel SIRE; adjusting the DLTPC rejection threshold based on the determined scaling factor; and rejecting or accepting the DLTPC command based on the adjusted DLTPC rejection threshold.

32 Claims, 9 Drawing Sheets

(51) Int. Cl.
 *H04W 52/56* (2009.01)
 *H04W 52/08* (2009.01)

(56) References Cited

U.S. PATENT DOCUMENTS

| | | |
|---|---|---|
| 2005/0075122 A1 | 4/2005 | Lindoff et al. |
| 2007/0021139 A1 | 1/2007 | Baker et al. |
| 2010/0323746 A1 | 12/2010 | Zhang et al. |
| 2011/0081940 A1 | 4/2011 | Gerstenberger et al. |
| 2012/0178493 A1 | 7/2012 | Marquez |
| 2012/0195357 A1 | 8/2012 | Chen et al. |
| 2013/0010704 A1 | 1/2013 | Kronquist et al. |
| 2013/0034008 A1 | 2/2013 | Kazmi |
| 2013/0072250 A1 | 3/2013 | Zhang et al. |
| 2013/0077519 A1 | 3/2013 | Van Lieshout et al. |
| 2013/0129010 A1 | 5/2013 | Xi et al. |
| 2014/0254537 A1* | 9/2014 | Kim et al. ............ 370/329 |
| 2014/0269597 A1* | 9/2014 | Park et al. ............ 370/329 |

* cited by examiner

METHODS AND APPARATUS FOR SIRE-BASED DLTPC REJECTION

CLAIM OF PRIORITY UNDER 35 U.S.C. §119

The present Application for patent claims priority to Provisional Application No. 61/655,897 entitled "Methods and Apparatus for Sire-Based ULTPC Rejection" filed on Jun. 5, 2012, and assigned to the assignee hereof and hereby expressly incorporated by reference herein.

BACKGROUND

1. Field

Aspects of the present disclosure relate generally to wireless communication, and more particularly, to methods and apparatus for rejecting unreliable downlink (DL) transmit power control (TPC) commands based on signal-to-interference-ratio estimates.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In a typical wireless communication environment, RF signal transmissions between a base station (e.g., NodeB in UMTS) and user equipment (UE) are subject to degradation, such as path loss, shadow fading and multipath, which is typically caused by such factors as terrain contours (e.g., mountains, forests), environment (e.g., urban or rural), propagation medium (dry or moist air), changes in distance between a base stations and a mobile UE, etc. Due to the signal degradation, transmit power of the UE may be too low, which may cause dropped calls or failed data transmissions. The UE's transmit power is typically controlled by the downlink (DL) Transmit Power Control (TPC) commands that are sent from NodeB to UE through downlink (DL) Dedicated Physical Control Channel (DPCCH). UE decodes these DLTPC bits (either 0/Down or 1/Up) and adjusts its transmit power accordingly. However, the transmit power may be improperly adjusted due to DLTPC decoding errors when the signal quality on the DL channel is poor. In other words, for DLTPC signals having very low Signal-to-Interference-Ratio Estimate (SIRE), the DLTPC decode reliability degrades significantly, which may cause incorrect adjustment in UE's transmitter power. Therefore, there is need for a mechanism for rejecting unreliable DLTPC commands.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed are methods and apparatus for rejecting unreliable DLTPC commands based on SIRE. In one aspect, the method includes receiving by a UE an DLTPC command from a base station, calculating SIRE of the DL channel, determining a scaling factor for a DLTPC rejection threshold based on the SIRE, adjusting the DLTPC rejection threshold based on the determined scaling factor, and rejecting or accepting the received DLTPC command based on the adjusted DLTPC rejection threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As explained above, UE's transmit power may be improperly adjusted due to DLTPC decoding errors when the signal quality on the DL channel is poor. For example, DLTPC signals having very low SIRE (i.e., soft DLTPC commands) may be incorrectly decoded, which may cause incorrect adjustment in UE's transmit power. To address this problem it has been proposed to use a DLTPC rejection threshold to reject these unreliable soft DLTPC commands. Any soft DLTPC command whose absolute value is higher than the rejection threshold may be decoded to +1 or −1 based on the sign of the soft DLTPC command. The DLTPC rejection threshold may be calculated by scaling the estimated noise amplitude by a constant. This constant is typically fixed and applies to all SIREs. However, this may cause problems in the scenario where the SIRE is really low (e.g., negative SIRE). In other words, rejecting of an unreliable soft DLTPC may cause high DLTPC error rate for low SIREs. Accordingly, proposed herein are systems and methods for dynamically adjusting DLTPC rejection threshold.

Figure 1:
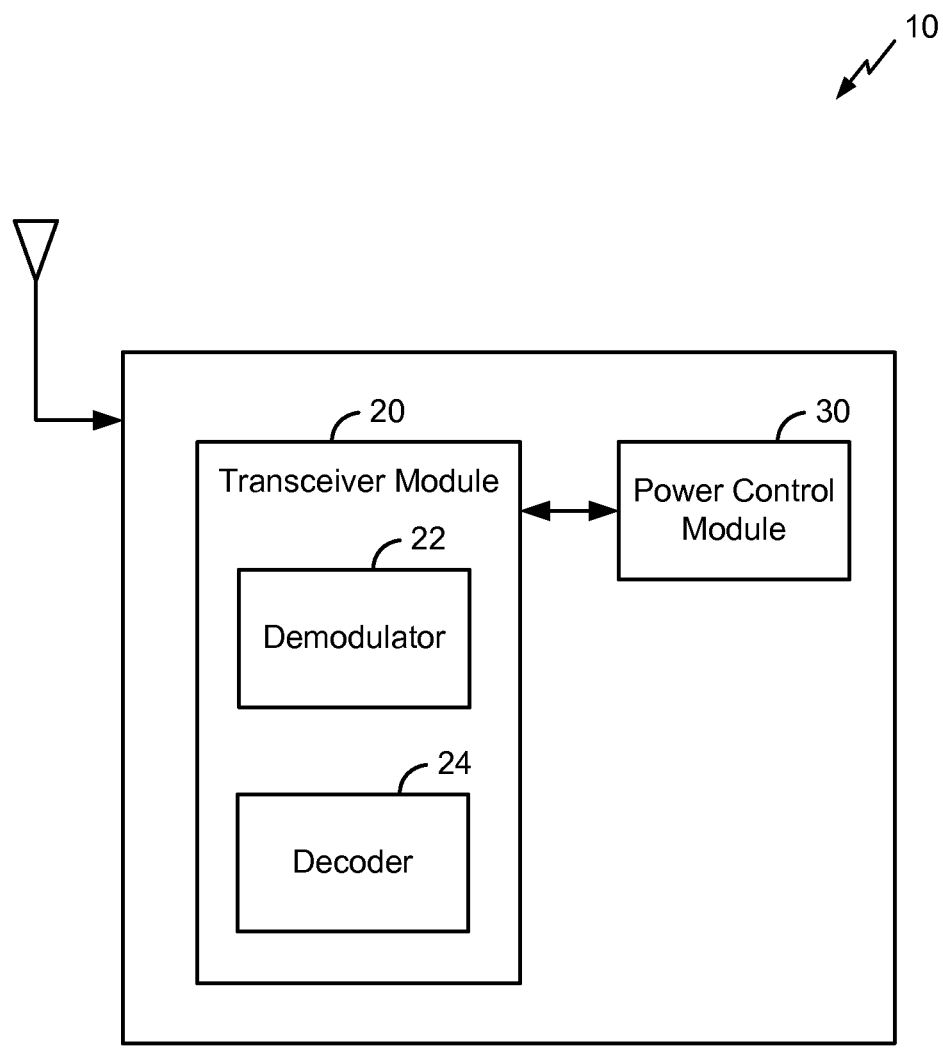
FIG. 1 is a block diagram illustrating an example of a processing system for rejecting unreliable DLTPC commands according to one aspect.

FIG. 1 a block diagram illustrating one aspect of a processing system implemented in a UE 10 for rejecting unreliable soft DLTPC commands from base station(s) (e.g., Node B) based on SIRE. The system includes a transceiver module 20 and a power control module 30. The transceiver module may include a RF circuitry for sending/receiving RF signals to/from base stations (e.g., Nodes B). Particularly, the transceiver module 20 is operable to receive DLTPC commands from one or more base station(s) on a downlink (DL) Dedicated Physical Control Channel (DPCCH). The transceiver module 20 includes a demodulator (22) and decoder (24), which respectively demodulate and decode the DLTPC commands. The DLTPC command usually includes bits (either 0/Down or 1/Up). The transceiver module 20 forwards the decoded DLTPC command to the power control module 30, which is configured to control transmitting power of the UE 10 based on received DLTPC command.

Figure 2:
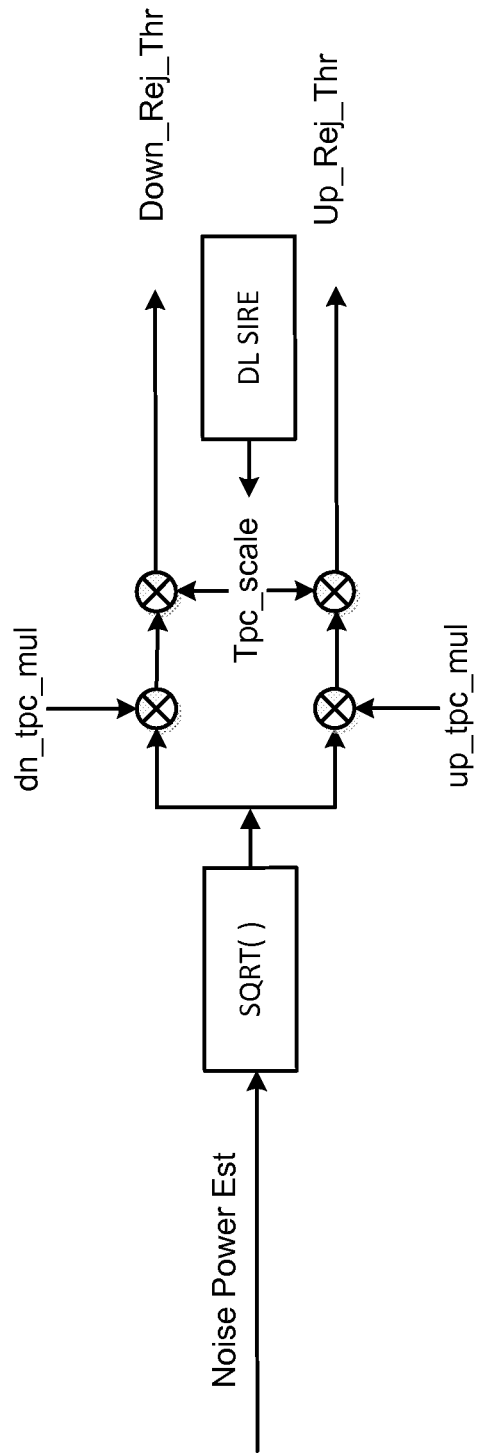
FIG. 2 is a block diagram illustrating an example of a processing system for rejecting unreliable DLTPC commands according to another aspect.

FIG. 2 shows an example implementation of the power control module 30. In one aspect, the DLTPC rejection threshold may be computed as proportional to the noise amplitude estimate (e.g., square root of the noise power estimate) of DL pilot signals and dynamically adjusted (or scaled) by a scaling factor tpc_scale. In one aspect, the scaling factor may be computed based on the DL channel SIRE, which may be based on the DPCCH, and thus can be estimated from the dedicated pilots (DP) or from the DLTPC itself. In another aspect, the DLTPC rejection threshold may be calculated from a cumulative noise estimate of pilot signals from several base stations (e.g., a TPC group), as will be explained in greater detail below.

Generally, the lower is the DL channel SIRE, the higher is the scaling factor tpc_scale selected by module 30. In one aspect, the scaling factor may be selected through a look up table (LUT) maintained by module 30. For example, the LUT may indicate that for a SIRE<−6 dB, the tpc_scale=16; and for −6 dB<SIRE<−3 dB, the tpc_scale=8. These values are exemplary and other DL SIRE ranges and scaling factors can be ready selected based on the specific implementation of the wireless communication system and environment in which UE operates. Thus, module 30 dynamically selects appropriate tpc_scale based on the range of DL SIREs.

As shown in FIG. 2, in one aspect, the DLTPC rejection threshold may include two different rejection thresholds for Up and Down DLTPC commands: a down DLTPC rejection threshold (Down_Rej_Thr) and up DLTPC rejection threshold (Up_Rej_Thr). Each of these thresholds may be calculated based on the pilot's noise power estimate (e.g., square root of the noise power estimate) multiplied by one of the dn_tpc_mul and up_tpc_mul factors. These factors may be selected based on the minimum requirement for a DLTPC rejection ratio at some pre-determined conditions and optimized offline in a simulation environment or tuned over time in an adaptive manner based on actual signal decode success/failure measurements in diverse communications environments. Once the Up and Down DLTPC rejection thresholds are calculated and scaled by the appropriate scaling factor (tpc_scale), the power control module 30 may compare the signal strength of the DLTPC command with the scaled DLTPC rejection thresholds. In one aspect, the power control module 30 may reject positive DLTPC command if the signal strength of the DLTPC command is below the down DLTPC rejection threshold. In another aspect, the power control module 30 may reject negative DLTPC command if its value is above the up DLTPC rejection threshold. If the DLTPC command is acceptable, the power control module 30 may instruct the transceiver module 20 to make appropriate power adjustments to the transmit signal of the UE based on the value specified in the accepted DLTPC command.

Figure 3:
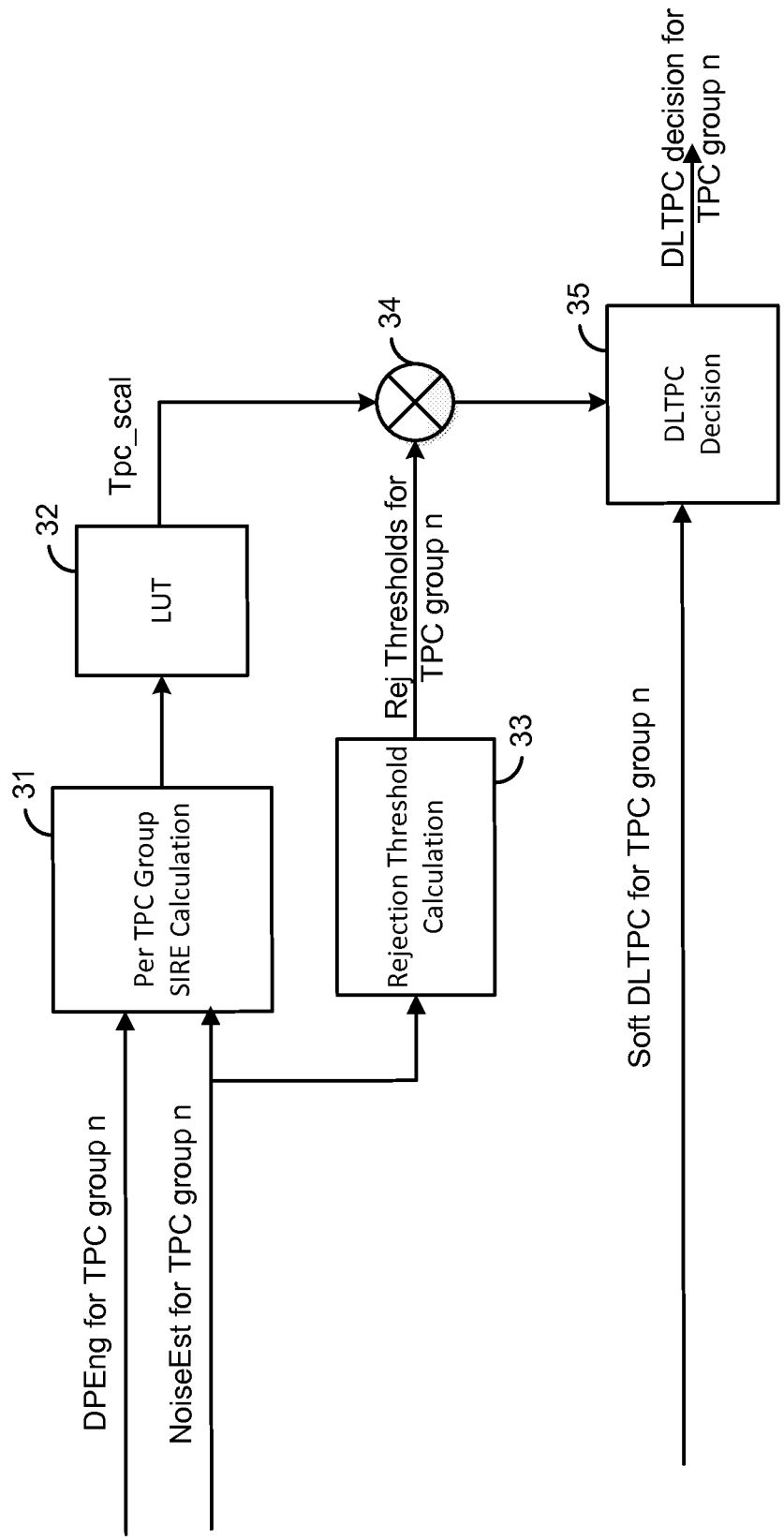
FIG. 3 is a block diagram illustrating an example of a processing system for rejecting unreliable DLTPC commands according to another aspect.

FIG. 3 illustrates another implementation of the power control module 30. Particularly, the 3GPP standard specifies that DLTPC demodulation may be done per TPC group (e.g., a group of one or more base stations being in active communication with the UE). Therefore, in this implementation, the DLTPC rejection threshold may be generated per TPC group. In this case, a cumulative noise estimate from pilot signals from base stations in a TPC group may be used to calculate a DLTPC rejection threshold. More specifically, in block 31, the power control module 30 may calculate a cumulative SIRE for each TPC group based on a cumulative noise power estimate (NoiseEst) for TPC group n and signal power (DPEng, which is the square of DP or DLTPC amplitude estimation) for a TPC group n. In block 32, module 30 may use cumulative SIRE for each TPC group to find a corresponding tpc_scale for each group using a look up table (LUT). In block 33, module 30 may calculate Up and Down DLTPC rejection thresholds for each TPC group based on noise power estimate (NoiseEst) for each TPC group. This can be done by computing square root of the noise power estimates for a TPC group and multiplying it by one of the dn_tpc_mul and up_tpc_mul factors, as explained above. In block 34, the DLTPC thresholds may be scaled by the appropriate tpc_scale factor. Finally, in block 35, module 30 can make DLTPC rejection/acceptance decisions for each TPC group based on the scaled Up and Down DLTPC rejection thresholds.

Figure 4:
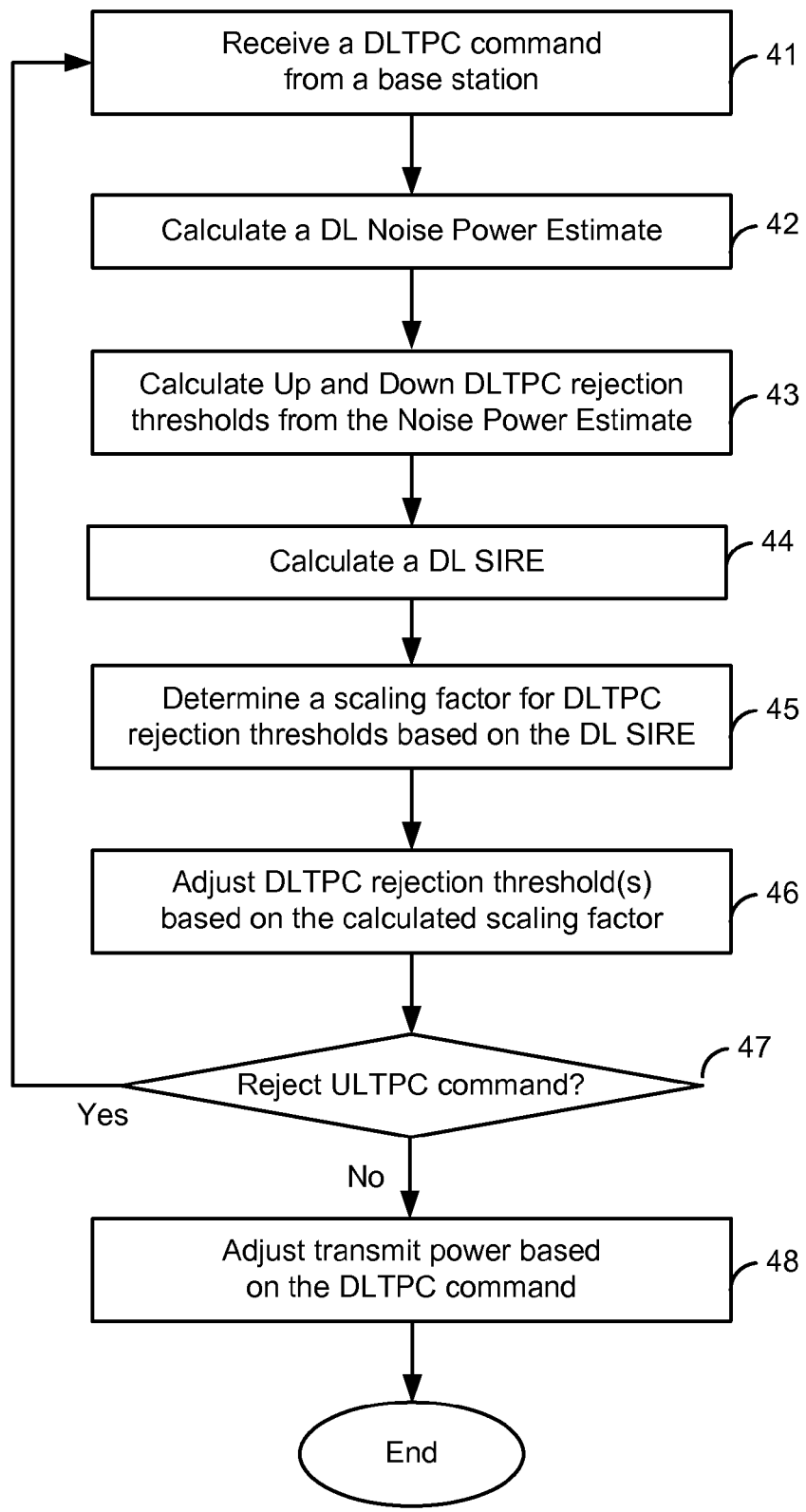
FIG. 4 is a flow diagram illustrating an example of a methodology for rejecting unreliable DLTPC commands according to one aspect.

FIG. 4 illustrates an example method for rejecting unreliable DLTPC commands according to one aspect. For explanatory purposes, FIG. 4 will be discussed with reference to the above-discussed FIG. 1. It, should however be understood that in other implementations, different modules other than those illustrated in FIG. 1 may be used in implementing the method of FIG. 4. At step 41, the transceiver module 20 of UE 10 receives a DLTPC command from a base station, demodulates and decodes the received UTLPC command, and provides the decoded DLTPC command to power control module 30. At step 42, power control module 30 of the UE 10 calculates noise power estimate on the DL channel. At step 43, module 30 calculates Up and Down DLTPC rejection thresholds based on the DL noise power estimate. At step 44, module 30 calculates a DL channel SIRE. At step 45, module 30 determines a scaling factor for the DLTPC rejection thresholds based on the DL SIRE. At step 46, module 30 adjusts the DLTPC rejection thresholds based on the determined scaling factor. At steps 47, module 30 compares the value of the DLTPC command with the scaled Up or Down DLTPC rejection thresholds to determine whether to accept or reject the DLTPC command. If the DLTPC command is accepted, then at step 48, module 30 adjusts UE's transmit power up or down according to the value of the DLTPC command. If the DLTPC command is rejected as being unreliable, the processing returns to step 41 at which the UE listens for a new DLTPC command from the base station.

Figure 5:
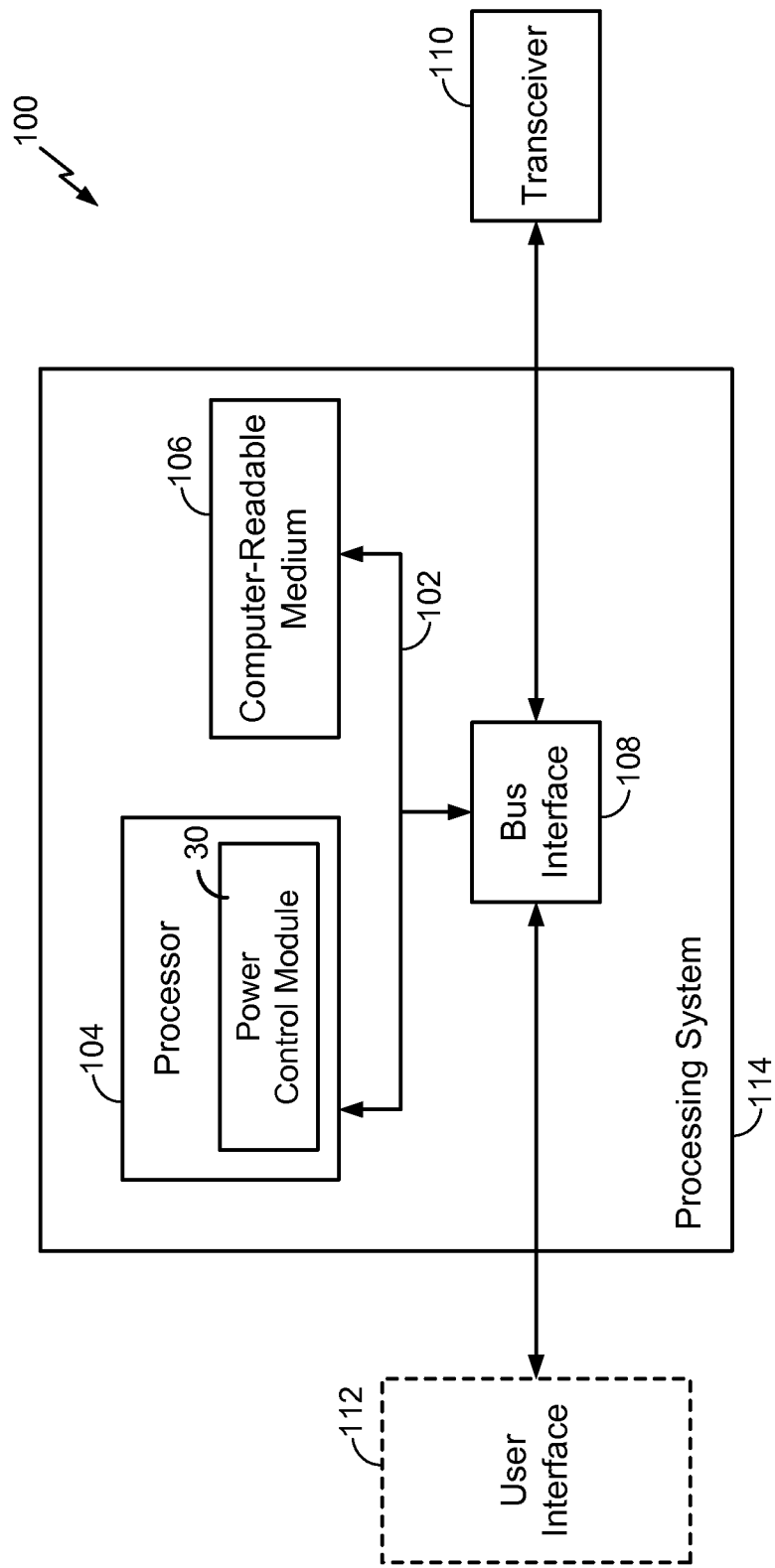
FIG. 5 is a block diagram illustrating an example of a hardware implementation for an apparatus employing a processing system.

FIG. 5 is a block diagram illustrating an example of a hardware implementation for an apparatus 100 employing a processing system 114. The apparatus 100 may be, for example, UE 10 of FIG. 1 and accordingly implement the methods and systems of FIGS. 2-4. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. In one aspect, the processing 104 may includes a power control module 30, which can be implemented as a set of instructions for calculating DLTPC rejection thresholds and using it to reject/accept DL channel DLTPC commands. The computer-readable medium 106 may also be used for storing data that is manipulated by the processor 104 when executing software, such as various look up tables (not shown) containing scaling factors and other data used by the power control module 30.

Figure 6:
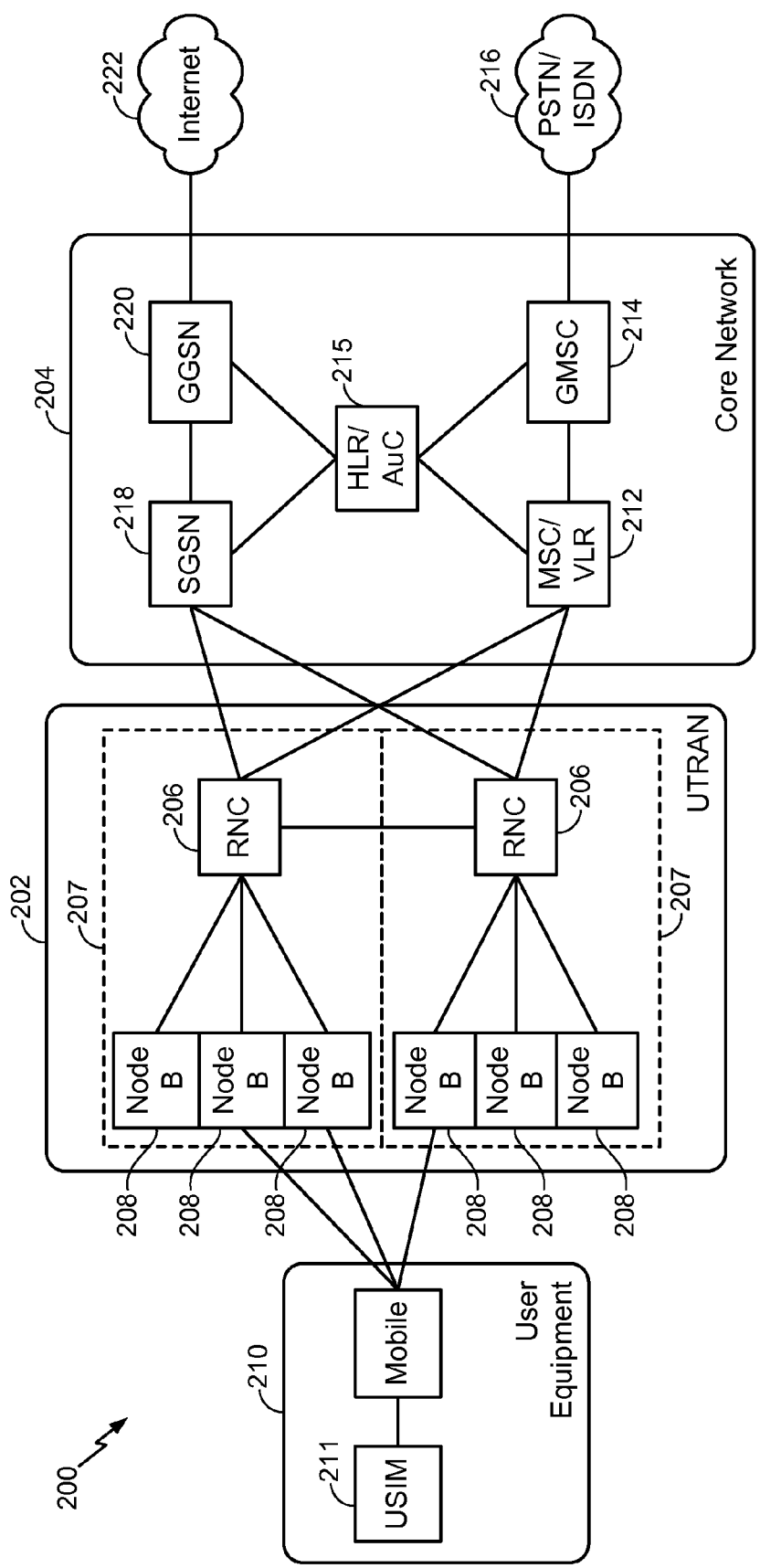
FIG. 6 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 6 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. UE 210 may be, for example, UE 10 of FIG. 1 and accordingly implement the methods and systems of FIGS. 2-4. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of UEs 201, which may be mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
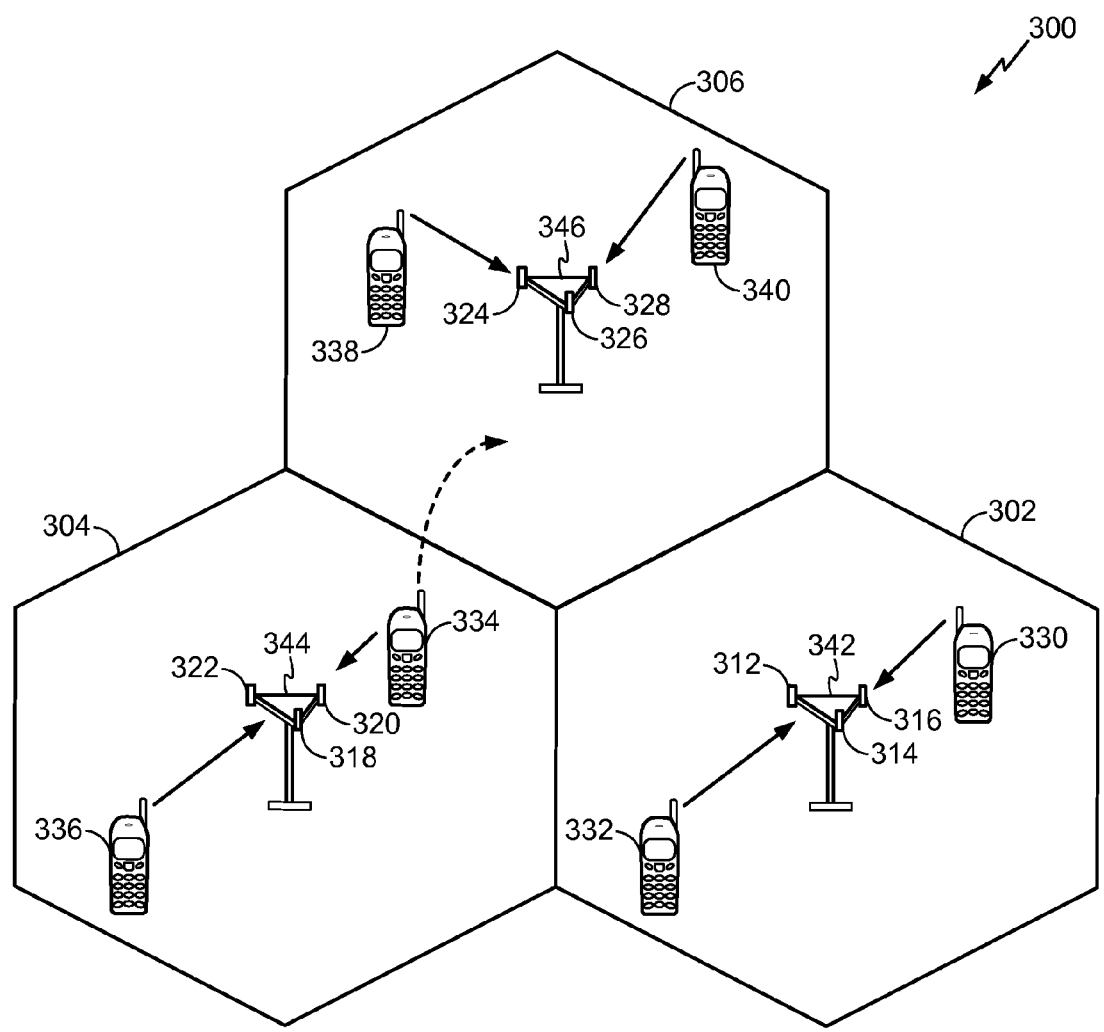
FIG. 7 is a conceptual diagram illustrating an example of an access network.

Referring to FIG. 7, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 6) for all the UEs 330, 332, 334, 336, 338, 340 in the respective cells 302, 304, and 306. One or more or all of UEs 330, 332, 334, 336, 338, 340 may be UEs such as, for example, UE 10 of FIG. 1 and accordingly implement the methods and systems of FIGS. 2-4.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 6), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 8:
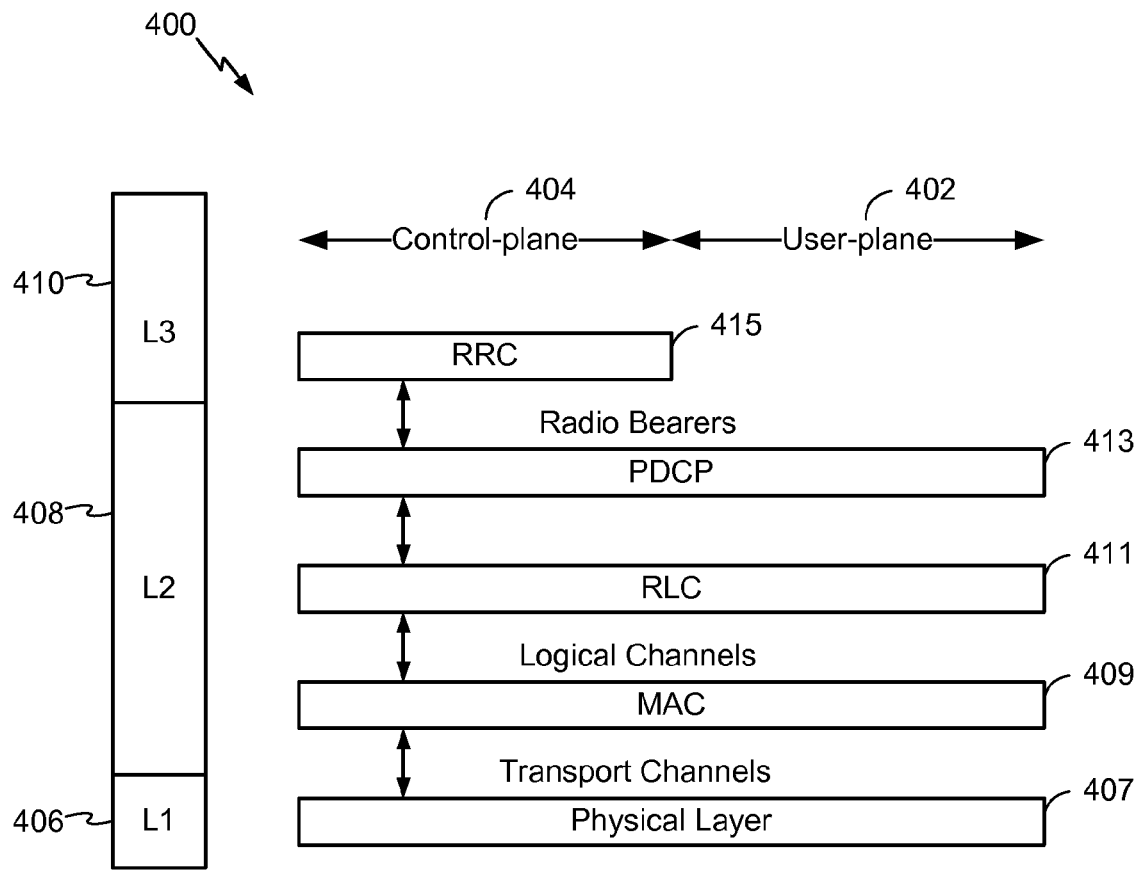
FIG. 8 is a conceptual diagram illustrating an example of a radio protocol architecture for the user and control plane.

The radio protocol architecture may take on various forms depending on the particular application. An example for an HSPA system will now be presented with reference to FIG. 8. An example radio protocol architecture 400 relates to the user plane 402 and the control plane 404 of a user equipment (UE) or node B/base station. For example, architecture 400 may be included in a UE 10 (FIG. 1). The radio protocol architecture 400 for the UE and node B is shown with three layers: Layer 1 406, Layer 2 408, and Layer 3 410. Layer 1 406 is the lowest layer and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 9:
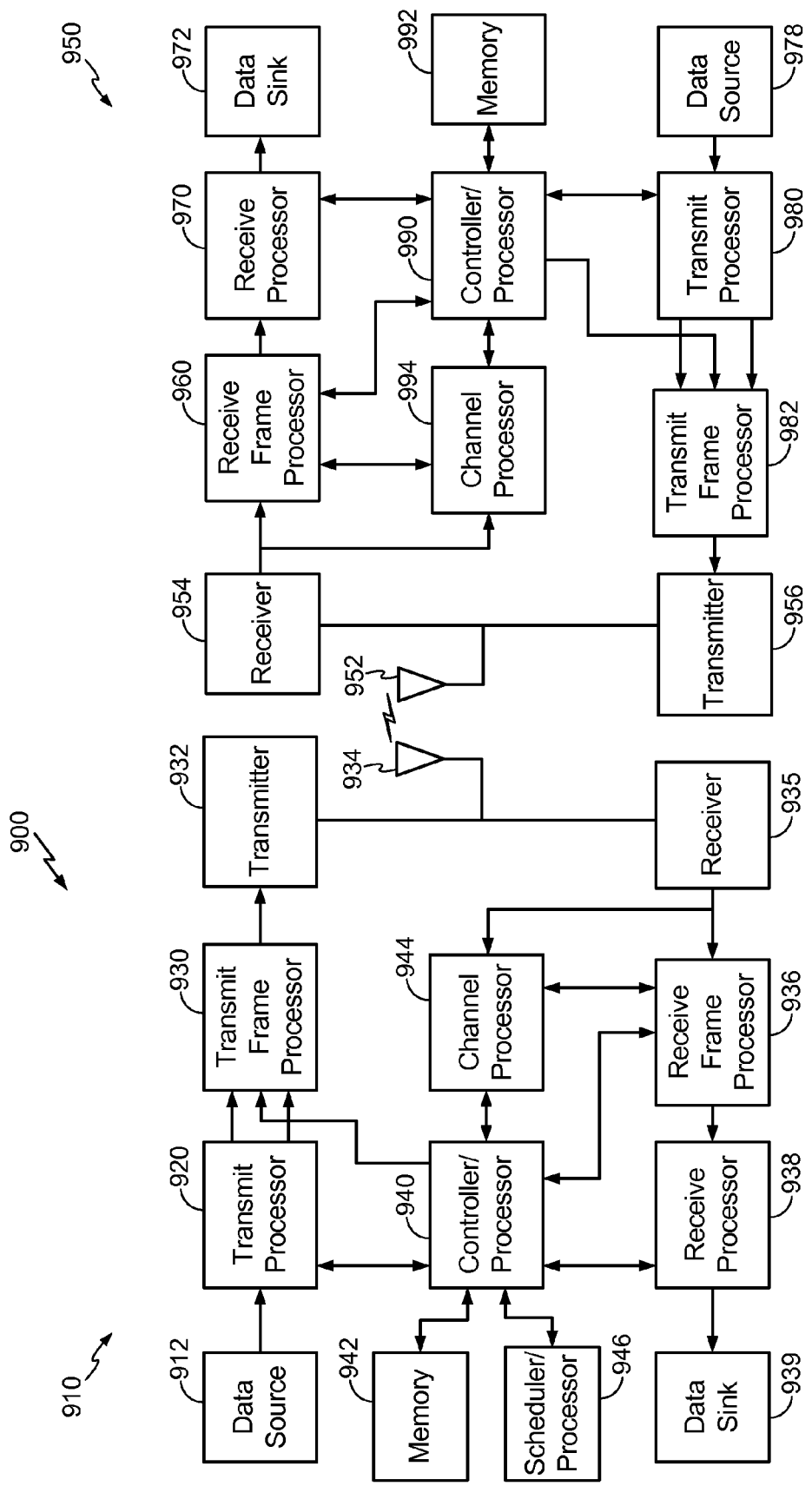
FIG. 9 is a block diagram conceptually illustrating an example of a Node B in communication with a UE in a telecommunications system.

FIG. 9 is a block diagram of a Node B 510 in communication with a UE 550, such as UE 10 (FIG. 1), where the Node B 510 may be the Node B 208 in FIG. 6, and the UE 550 may be the UE 210 in FIG. 6. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

What is claimed is:

1. A method of wireless communication, comprising:
    receiving a downlink (DL) transmit power control (TPC) command from a base station on a DL channel;
    calculating signal-to-interference ratio estimate (SIRE) of the DL channel;
    calculating a cumulative DL channel SIRE for a group of multiple base stations;
    determining a scaling factor for a DLTPC rejection threshold based on the cumulative DL channel SIRE for the group of multiple base stations;
    adjusting the DLTPC rejection threshold based on the determined scaling factor; and
    rejecting or accepting the DLTPC command based on the adjusted DLTPC rejection threshold.

2. The method of claim 1, wherein rejecting or accepting the DLTPC command based on the adjusted DLTPC rejection threshold further includes:
    comparing a value of the DLTPC command with the adjusted DLTPC rejection threshold.

3. The method of claim 2, wherein the DLTPC rejection threshold includes one or more of a down DLTPC rejection threshold and an up DLTPC rejection threshold.

4. The method of claim 3, further comprising:
    rejecting a positive DLTPC command when the value of the DLTPC command is below the down DLTPC rejection threshold; and
    rejecting a negative DLTPC command when the value of the DLTPC command is above the up DLTPC rejection threshold.

5. The method of claim 1, wherein determining the scaling factor for the DLTPC rejection threshold based on the cumulative DL channel SIRE includes:
    providing a look-up table containing a plurality of scaling factors corresponding to a plurality of different cumulative DL channel SIRE values; and
    selecting the scaling factor from the look-up table based on the calculated cumulative DL channel SIRE.

6. The method of claim 1, wherein the SIRE of the downlink channel is calculated based on one of a dedicated pilot (DP) signal and a DLTPC signal.

7. The method of claim 1, wherein the DLTPC rejection threshold is calculated as a function of noise power estimate of a pilot signal.

8. The method of claim 1, wherein the cumulative DL channel SIRE is based on a cumulative noise power estimate for the group of multiple base stations and a signal power of the group of multiple base stations.

9. An apparatus for wireless communication, comprising:
    at least one processor configured to:
    receive a downlink (DL) transmit power control (TPC) command from a base station on a DL channel;
    calculate signal-to-interference ratio estimate (SIRE) of the DL channel;
    calculate a cumulative DL channel SIRE for a group of multiple base stations;
    determine a scaling factor for a DLTPC rejection threshold based on the cumulative DL channel SIRE for the group of multiple base stations;
    adjust the DLTPC rejection threshold based on the determined scaling factor; and
    reject or accept the DLTPC command based on the adjusted DLTPC rejection threshold.

10. The apparatus of claim 9, wherein to reject or accept the DLTPC command based on the adjusted DLTPC rejection threshold, the processor being further configured to:
    compare a value of the DLTPC command with the adjusted DLTPC rejection threshold.

11. The apparatus of claim 10, wherein the DLTPC rejection threshold includes one or more of a down DLTPC rejection threshold and an up DLTPC rejection threshold.

12. The apparatus of claim 11, wherein the processor is further configured to:
    reject a positive DLTPC command if the value of the DLTPC command is below the down DLTPC rejection threshold; and
    reject a negative DLTPC command if the value of the DLTPC command is above the up DLTPC rejection threshold.

13. The apparatus of claim 9, wherein to determine the scaling factor for a DLTPC rejection threshold based on the cumulative DL channel SIRE, the processor is further configured to:
    provide a look-up table containing a plurality of scaling factors corresponding to a plurality of different cumulative DL channel SIRE values; and
    select the scaling factor from the look-up table based on the calculated cumulative DL channel SIRE.

14. The apparatus of claim 9, wherein the SIRE of the downlink channel is calculated based on one of a dedicated pilot (DP) signal and a DLTPC signal.

15. The apparatus of claim 9, wherein the DLTPC rejection threshold is calculated as a function of noise power estimate of a pilot signal.

16. The apparatus of claim 9, wherein the cumulative DL channel SIRE is based on a cumulative noise power estimate for the group of multiple base stations and a signal power of the group of multiple base stations.

17. A non-transitory computer-readable medium comprising:
    a first set of codes for receiving a downlink (DL) transmit power control (TPC) command from a base station on a DL channel;
    a second set of codes for calculating signal-to-interference ratio estimate (SIRE) of the DL channel;
    a third set of codes for calculating a cumulative DL channel SIRE for a group of multiple base stations;
    a fourth set of codes for determining a scaling factor for a DLTPC rejection threshold based on the cumulative DL channel SIRE;
    a fifth set of codes for adjusting the DLTPC rejection threshold based on the determined scaling factor; and a sixth set of codes for rejecting or accepting the DLTPC command based on the adjusted DLTPC rejection threshold.

18. The medium of claim 17, wherein the sixth set of codes for rejecting or accepting the DLTPC command based on the adjusted DLTPC rejection threshold further includes:
a seventh set of codes for comparing a value of the DLTPC command with the adjusted DLTPC rejection threshold.

19. The medium of claim 18, wherein the DLTPC rejection threshold includes one or more of a down DLTPC rejection threshold and an up DLTPC rejection threshold.

20. The medium of claim 19, further comprising:
an eighth set of codes for rejecting positive DLTPC command when the value of the DLTPC command is below the down DLTPC rejection threshold; and
a ninth set of codes for rejecting negative DLTPC command when the value of the DLTPC command is above the up DLTPC rejection threshold.

21. The medium of claim 17, wherein the third set of codes for determining the scaling factor for a DLTPC rejection threshold based on the cumulative DL SIRE includes:
a tenth set of codes for providing a look-up table containing a plurality of scaling factors corresponding to a plurality of different cumulative DL channel SIRE values; and
an eleventh set of codes for selecting the scaling factor from the look-up table based on the calculated cumulative DL channel SIRE.

22. The medium of claim 17, wherein the DL SIRE of the downlink channel is calculated based on one of a dedicated pilot (DP) signal and a DLTPC signal.

23. The medium of claim 17, wherein the DLTPC rejection threshold is calculated as a function of noise power estimate of a pilot signal.

24. The non-transitory computer-readable medium of claim 17, wherein the cumulative DL channel SIRE is based on a cumulative noise power estimate for the group of multiple base stations and a signal power of the group of multiple base stations.

25. An apparatus for wireless communication, comprising:
means for receiving a downlink (DL) transmit power control (TPC) command from a base station on a DL channel;
means for calculating signal-to-interference ratio estimate (SIRE) of the DL channel;
means for calculating a cumulative DL channel SIRE for a group of multiple base stations;
means for determining a scaling factor for a DLTPC rejection threshold based on the cumulative DL channel SIRE;
means for adjusting the DLTPC rejection threshold based on the determined scaling factor; and
means for rejecting or accepting the DLTPC command based on the adjusted DLTPC rejection threshold.

26. The apparatus of claim 25, wherein means for rejecting or accepting the DLTPC command based on the adjusted DLTPC rejection threshold further includes:
means for comparing a value of the DLTPC command with the adjusted DLTPC rejection threshold.

27. The apparatus of claim 26, wherein the DLTPC rejection threshold includes one or more of a down DLTPC rejection threshold and an up DLTPC rejection threshold.

28. The apparatus of claim 27, further comprising:
means for rejecting a positive DLTPC command when the value of the DLTPC command is below the down DLTPC rejection threshold; and
means for rejecting a negative DLTPC command when the value of the DLTPC command is above the up DLTPC rejection threshold.

29. The apparatus of claim 25, wherein the means for determining the scaling factor for a DLTPC rejection threshold based on the cumulative DL channel SIRE include:
means for providing a look-up table containing a plurality of scaling factors corresponding to a plurality of different cumulative DL channel SIRE values; and
means for selecting the scaling factor from the look-up table based on the calculated cumulative DL channel SIRE.

30. The apparatus of claim 25, wherein the SIRE of the downlink channel is calculated based on one of a dedicated pilot (DP) signal and a DLTPC signal.

31. The apparatus of claim 25, wherein the DLTPC rejection threshold is calculated as a function of noise power estimate of a pilot signal.

32. The apparatus of claim 25, wherein the cumulative DL channel SIRE is based on a cumulative noise power estimate for the group of multiple base stations and a signal power of the group of multiple base stations.

* * * * *